US009325751B2

(12) United States Patent
Bosworth et al.

(10) Patent No.: US 9,325,751 B2
(45) Date of Patent: Apr. 26, 2016

(54) DETERMINING OBJECT RELEVANCE IN A SOCIAL NETWORKING SYSTEM

(71) Applicant: Facebook, Inc., Menlo Park, CA (US)

(72) Inventors: Andrew G. Bosworth, Palo Alto, CA (US); Aruna Bharathi, San Jose, CA (US)

(73) Assignee: FACEBOOK, INC., Menlo Park, CA (US)

(*) Notice: Subject to any disclaimer, the term of this patent is extended or adjusted under 35 U.S.C. 154(b) by 128 days.

(21) Appl. No.: 13/688,020

(22) Filed: Nov. 28, 2012

(65) Prior Publication Data

US 2014/0149504 A1    May 29, 2014

(51) Int. Cl.
*G06Q 50/00* (2012.01)
*H04L 29/06* (2006.01)

(52) U.S. Cl.
CPC .............. *H04L 65/403* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,827,208 B2 | 11/2010 | Bosworth et al. | |
| 8,108,414 B2 | 1/2012 | Stackpole | |
| 8,334,871 B2 * | 12/2012 | Hamilton, II | G06F 3/04815 345/473 |
| 8,566,263 B2 | 10/2013 | Flinn et al. | |
| 8,600,920 B2 | 12/2013 | Flynn et al. | |
| 8,688,701 B2 * | 4/2014 | Ghosh | G06F 17/30699 706/54 |
| 8,692,835 B2 * | 4/2014 | Hamilton, II | G06F 3/04815 345/522 |
| 2006/0200432 A1 * | 9/2006 | Flinn | G06N 5/048 706/12 |
| 2006/0200433 A1 * | 9/2006 | Flinn | G60N 99/005 706/12 |
| 2006/0200434 A1 * | 9/2006 | Flinn | G06N 99/005 706/12 |
| 2006/0200435 A1 * | 9/2006 | Flinn | G06N 99/005 706/12 |
| 2008/0033959 A1 * | 2/2008 | Jones | G06F 17/30699 |
| 2008/0040475 A1 | 2/2008 | Bosworth et al. | |
| 2008/0270552 A1 * | 10/2008 | Flake | G06Q 30/02 709/206 |
| 2009/0070219 A1 | 3/2009 | D'Angelo et al. | |
| 2009/0144075 A1 * | 6/2009 | Flinn | G06N 5/048 705/318 |
| 2010/0063993 A1 | 3/2010 | Higgins et al. | |
| 2010/0076850 A1 | 3/2010 | Parekh et al. | |
| 2010/0114702 A1 * | 5/2010 | Wu | G06Q 30/0255 705/14.53 |
| 2010/0144426 A1 * | 6/2010 | Winner | G07F 17/32 463/25 |
| 2010/0145777 A1 * | 6/2010 | Ghosh | G06Q 30/02 705/14.1 |
| 2010/0153185 A1 * | 6/2010 | Ghosh | G06Q 10/04 705/7.11 |
| 2010/0153329 A1 * | 6/2010 | Ghosh | G06Q 30/02 706/54 |
| 2010/0325107 A1 * | 12/2010 | Kenton et al. | 707/723 |
| 2010/0331146 A1 | 12/2010 | Kil | |
| 2011/0225170 A1 | 9/2011 | Obasanjo et al. | |
| 2012/0084160 A1 | 4/2012 | Badros et al. | |
| 2012/0124508 A1 | 5/2012 | Morin et al. | |

(Continued)

OTHER PUBLICATIONS

PCT International Search Report and Written Opinion, PCT Application No. PCT/US2013/069855, Feb. 26, 2014, twelve pages.

(Continued)

*Primary Examiner* — Ninos Donabed
(74) *Attorney, Agent, or Firm* — Fenwick & West LLP

(57) ABSTRACT

An influence metric describing the influence of a social networking system object on social networking system users is determined based on affinities between the users and the object. For example, affinities between the associated users and the object are combined to determine the influence metric. Content may be selected for presentation to users based in part on influence metrics of the content. Additionally, influence metrics of objects associated with a user may be combined to determine the relevance of objects associated with the user, which may also be used to select content for presentation to the user.

20 Claims, 5 Drawing Sheets

(56) References Cited

U.S. PATENT DOCUMENTS

| | | |
|---|---|---|
| 2012/0166532 A1 | 6/2012 | Juan et al. |
| 2012/0226564 A1 | 9/2012 | Banadaki et al. |
| 2012/0232966 A1* | 9/2012 | Calman .................. G06Q 30/02 705/14.1 |
| 2012/0254074 A1* | 10/2012 | Flinn ........................ G06N 7/02 706/4 |
| 2012/0254075 A1* | 10/2012 | Flinn ........................ G06N 7/02 706/4 |
| 2013/0173368 A1* | 7/2013 | Boutin et al. ............... 705/14.16 |
| 2014/0089048 A1* | 3/2014 | Bruich ........................ 705/7.32 |

OTHER PUBLICATIONS

Mislove, A., et al., "You Are Who You Know: Inferring User Profiles in Online Social Networks," *Proceedings of WSDM '10*, Feb. 4-6, 2010, pp. 251-260, New York, NY.

\* cited by examiner

DETERMINING OBJECT RELEVANCE IN A SOCIAL NETWORKING SYSTEM

BACKGROUND

This invention relates generally to social networking systems, and in particular to determining measures of influence for objects maintained by a social networking system.

A social networking system typically maintains a variety of objects, which each represent data maintained by the social networking system. Examples of objects maintained by a social networking system include: a user profile, a page, a page post, a status update, a photo, a video, a link, a shared content item, a gaming application achievement, a check-in event at a local business, a brand page, or any other type of content. As users perform interactions with social networking system objects, the social networking system stores information identifying an interaction, a user performing the interaction, and an object associated with the interaction. Examples of interactions include viewing an object, commenting on an object, sharing an object, expressing a preference for an object ("liking" the object), or other types of interactions.

The social networking system may determine the relevance of an object to a user based on interactions between the user and the object. For example, the number of times the user interacts with an object, the frequency with which a user interacts with the object, communications by the user associated with the object, an expression of the user's preference for the object, and/or other interactions with the object may be used to determine the relevance of the object to the user. In addition to allowing users to interact with objects, the social networking system allows users to establish connections with other users to share information. These connections between users may be used to identify objects likely to be of interest to a user. For example, if two users connected to each other frequently communicate via the social networking system, the social networking system may infer that an object relevant to one of the users is likely to be also relevant to the other user.

Determining an object's relevance to a user based on the object's relevance to other users connected to the user has limitations. For example, a first object may be very relevant to a first user, but not relevant to a second user associated with the first user. Determining relevance based on user associations does not account for the universal relevance of the object to users throughout the social networking system (the object's "influence" within the social networking system). Additionally, determining an object's relevance based on connections between users does not account for users being in different geographic regions. For example, if a user accesses the social networking system while on vacation in a foreign country, objects associated with local businesses and tourist attractions may be less likely to be identified as relevant to the user, as other users connected to the user are unlikely to have interactions with objects associated with entities in the foreign country.

SUMMARY

A measure of an aggregate relevance of an object to users throughout a social networking system, or the "influence" of the object, is determined based on affinities that other users of the social networking system have for the object. In one embodiment, a target object is identified from the social networking system, and users associated with the target object are identified. Examples of a target object include a user profile, a page, a content item, or any other suitable object within the social networking system. A user may be associated with the target object if the user has established a connection to the target object or has interacted with the object. For example, if the target object is a user profile, identified users associated with the user profile may have established connections with the user profile. As another example, if the target object is a content item, identified users associated with the target object may be users that have viewed the target object, commented on the target object, shared the target object, or performed other suitable interactions with the target object.

An affinity between each user associated with the target object and the target object is determined. For example, affinities stored by the social networking system are retrieved. A user's affinity for the target object may be a measure of relevance of the target object to a user, a measure of a strength of relationship between the target object and the user, or a measure of a value of the target object to the user. Interactions between a user and the target object are used to determine the user's affinity for the target object. For example the affinity between a user and the target object may be based on a number of interactions performed on the target object by the user, based on a frequency of interactions performed on the target object by the user, or based on types of interactions performed on the target object by the user.

The accessed affinities are combined to determine an influence metric for the target object. The accessed affinities can be combined by determining a median or mean of the affinities as the influence metric, by adding the accessed affinities and using the sum as the influence metric, or by multiplying the accessed affinities and using the product as the influence metric. In one embodiment, the affinities are weighted as they are combined. For example, affinities may be weighted based on how recently a user associated with an affinity performed an action, allowing the affinities of users more recently interacting with the target object to be more highly weighted. The influence metric is stored for subsequent use. Influence metrics may be computed for multiple objects in the social networking system. The influence metrics may be periodically updated or influence metrics associated with different objects may be individually updated when a user interacts with an object associated with an influence metric.

Various actions may be performed by the social networking system based on influence metrics associated with objects. For example, a story is selected for display to users of the social networking system based on the influence metric associated with the story. Influence metrics associated with stories may be used to order or rank stories presented in a newsfeed or in a news ticker. An influence metric associated with an object may also control how the object is identified to a user. For example, an object's influence metric determines whether the object is presented to a user via a news feed or via a notification.

Additionally, influence metrics associated with advertisements ("ads") or with user profiles of users to which the ads are presented may be used when selecting ads. An advertiser may provide incentives for users having user profiles with at least a threshold influence score to allow the advertiser to sponsor actions of the users. Alternatively, an advertiser may identify user actions to sponsor based on the influence scores of user profiles. Further, location information or search results may be presented or ordered based on influence metrics associated with corresponding objects.

In one embodiment, the influence metrics for a plurality of target objects associated with a particular user are combined into a relevance metric associated with the user, which describes the overall relevance of objects associated with the user to the user. The relevance metric provides an indication of the influence of the objects associated with the user. To compute this relevance metric, a set of objects associated with a user is identified, and the influence metrics of each of the set of objects are combined to generate the relevance metric. As described above, an object may be considered to be associated with the user if the user is connected to the object or has interacted with the object.

The relevance metric may be determined as the mean, median, sum, product or other statistical measure of the influence metrics. In one embodiment, the influence metrics may be weighted prior to combination. A relevance metric may be used to select content for presentation to the user associated with the relevance metric. For example, content may be presented to users having a relevance metric above a threshold and not presented to users having a relevance metric below the threshold. As another example, the social networking system may suggest actions to users based on the associated relevance metric.

Additionally, relevance metrics for a set of users may be combined to form an aggregated relevance metric describing the relevance of objects associated with the set of users to the set of users. In one embodiment, the set of users has a common characteristic. For example, the set of users includes users with a common biographic characteristic or with a common geographic characteristic. Content presented to the set of users may be based on the aggregated relevance metric associated with the set of users. For example, an advertiser may decide to present a particular advertisement to users in Germany rather than to users in Bolivia based on the aggregated relevance metrics for the different sets of users.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
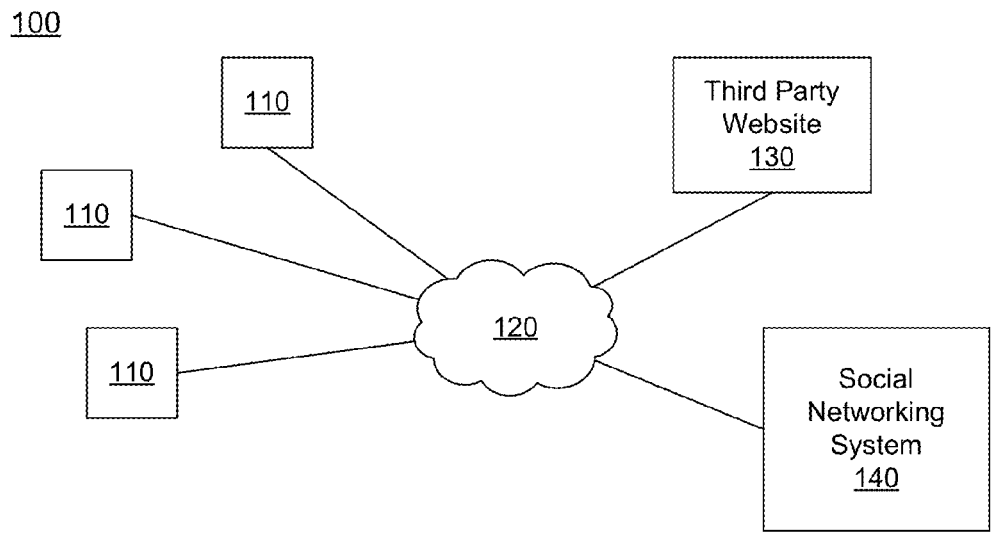
FIG. 1 is a block diagram of a system environment in which a social networking system operates, in accordance with an embodiment of the invention.

FIG. 1 is a high level block diagram illustrating a system environment 100 for a social networking system 140. The system environment 100 comprises one or more client devices 110, a network 120, one or more third-party websites 130 and the social networking system 140. In alternative configurations, different and/or additional components may be included in the system environment 100. The embodiments described herein may be adapted to online systems that are not social networking systems.

A client device 110 is a computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smartphone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, code division multiple access (CDMA), digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

A third party website 130 may be coupled to the network 120 for communicating with the social networking system 140, which is further described below in conjunction with FIG. 2. In one embodiment, the third party website 130 is an electronic mail server or another messaging server receiving messages from users and routing the received messages to other users for presentation via client devices 110. The third party website 130 may maintain accounts for various users and directs messages to various user accounts to communicate messages or other content to the users.

Figure 2:
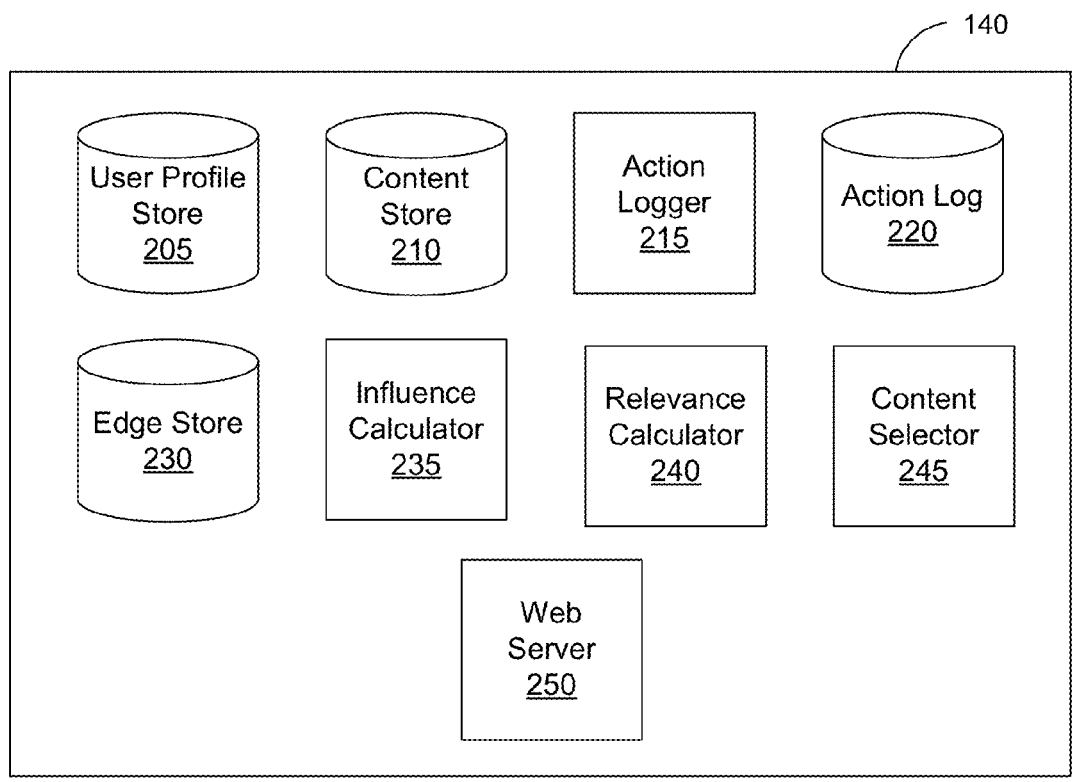
FIG. 2 is a block diagram of a social networking system, in accordance with an embodiment of the invention.

FIG. 2 is an example block diagram of an architecture of the social networking system 140. The social networking system 140 includes a user profile store 205, a content store 210, an action logger 215, an action log 220, an edge store 230, an influence calculator 235, a relevance calculator 240, a content selector 245 and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

Additionally, a user profile includes information for communicating with a corresponding user outside of the social networking system 140. For example, the user profile includes one or more electronic mail (email) addresses for communicating content to the user through an email server, or other third party website 130, external to the social networking system 140. As another example, a user profile includes a telephone number or other contact information for interacting with a corresponding user through a communication channel outside of the social networking system 140.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications, which may be external to the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system.

The action logger 215 receives communications about user actions on and/or off the social networking system 140, populating the action log 220 with information about user actions. Such actions may include, for example, adding a connection to another user, sending a message to another user, uploading an image, reading a message from another user, viewing content associated with another user, attending an event posted by another user, among others. In some embodiments, the action logger 215 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 220.

The action log 220 may be used by the social networking system 140 to track user actions on the social networking system 140, as well as external websites 130 that communicate information to the social networking system 140. Users may interact with various objects on the social networking system 140, including commenting on posts, sharing links, and checking-in to physical locations via a mobile device, accessing content items or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140 as well as other applications operating on the social networking system 140. In some embodiments, data from the action log 220 is used to infer interests or preferences of the user, augmenting the interests included in the user profile and allowing a more complete understanding of user preferences.

The action log 220 may also store user actions taken on external websites, such as third party website 130. For example, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

In one embodiment, an edge store 230 stores the information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

The edge store 230 stores information describing characteristics of edges, such as affinity scores for objects, interests, and other users. Affinity scores may be computed by the social networking system 140 over time to approximate a user's affinity for an object, interest, and other users in the social networking system 140 based on the actions performed by the user. Hence an object's affinity for another object may infer the relevance of the objects to each other. For example, if a first user (represented by a first node) is connected to a second user (represented by a second node) with an edge associated with a high affinity and is also connected to a third user (represented by a third node) with an edge associated with a lower affinity, an action taken by the second user may be inferred to be more relevant to the first user than an action taken by the third user. In another example, if a user frequently views a first image but does not frequently view a second image, a higher affinity may represent the connection between the user and the first image than the connection between the user and the second image. Accordingly, the affinity between a user and an object may be affected by the number, frequency, or type of interactions between the user and the object, by the type of association or connection between the user and the object, and/or by an inferred value of the object to the user, such as common objects or information associated with both the user and the object. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978, 265, filed on Dec. 23, 2010, which is hereby incorporated by reference in its entirety.

Multiple interactions between a user and a specific object may be stored in one edge object in the edge store 230, in one embodiment. For example two users may be connected by an edge representing a familial relationship, an edge representing a tagging of a user in a photograph by the other user, another edge representing a message from a user to the other user, and so forth. If multiple edges connect two objects, a combination of the affinities associated with each edge may be used to infer the relevance of the objects corresponding to the connected objects. For example, the average, weighted average, sum, weighted sum, or other combination of the affinities associated with the edges may be used to make inferences about the relevance of the objects corresponding to objects connected to each other by multiple edges. For simplicity, as used herein, an affinity associated with an edge refers to a single affinity associated with the edge between nodes representing the objects, although the single affinity may represent a combination of multiple affinities associated with multiple edges between objects. In some embodiments, connections between users may be stored in the user profile store 205, or the user profile store 205 may access the edge store 230 to determine connections between users.

The influence calculator 235 determines an influence metric for a target object maintained by the content store 210 or the user profile store 205. The influence metric describes the relevance of the target objects to overall users of the social networking system 140. Hence, the influence metric describes a global relevance of an object to multiple social networking system users. As further described below in conjunction with FIGS. 3 and 4, the influence calculator 235 identifies users associated with the target object based on data in the edge store 230 and determines the influence metric for the target object based on the affinities associated with edges between the target object and the users associated with the target object. For example, the influence metric may be a mean or median of the affinities between each of the users associated with the target object and the target object. It should be noted that in some embodiments, the influence calculator 235 can determine an influence metric for a set of target objects using the principles described herein. In such embodiments, the influence calculator 235 identifies users associated with one or more of the set of target objects, determines affinities for the one or more of the set of target objects by each identified user, and combines the determined affinities to determine the influence metric for the set of target objects.

The relevance calculator 240 generates a relevance metric associated with a user from influence metrics calculated by the influence calculator 235. The relevance metric represented the relevance of objects associated with a user to the user. For example, a user associated with objects that are highly relevant to the user may have a higher relevance metric than a user associated with objects less relevant to the user. In one embodiment, a relevance metric quantifies an average relevance of a set of objects associated with a user (e.g., objects with which the user interacted within a specified time interval); however, other methods of determining a relevance metric may be computed. A user with a high relevance metric may have a newsfeed, or a news ticker, including stories are more likely to be relevant to the user than a user with a lower relevance metric. Relevance metrics may be determined for multiple users having a specified characteristic and combined to form an aggregated relevance metric for the set of users by the relevance calculator 240. The aggregated relevance metric represents the relevance of objects associated with the set of users to the users in the set of users. Hence, relevance metrics and aggregated relevance metrics may be used to select a user or a set of users for content selection.

The content selector 245 selects content for presentation to a user of the social networking system 140. The content selector 245 can select content to provide to a user based on influence metrics from the influence calculator 235 and/or relevance metrics from the relevance calculator 240. For example, the content selector 245 identifies objects having the highest influence metrics or having influence metrics of at least a threshold value for presentation in stories presented to a user. Additionally, the content selector 245 can rank stories displayed within a newsfeed or news ticker based on the influence metric of an object associated with each displayed story. Recommendations of objects or actions may also be made based on influence metrics associated with objects associated with the actions, objects, and/or users. The content selector 245 may also determining the order in which objects (e.g., the order in which stories associated with objects are presented in a user's news feed) based in part on the influence metrics associated with the objects.

Based on influence metrics, the content selector 245 may also maintain rankings of objects maintained by the social networking system 140. A ranking allows the content selector 245 to identify the most influential objects maintained by the social networking system 140. The ranking may be provided to advertisers to encourage bidding for advertisements associated with more influential objects or may be used to recommend objects or actions for social networking system users.

Additionally, the content selector 245 may use an influence metric associated with an object to determine how the object is presented to a user. For example, objects associated with the highest influence metrics or with influence metrics having at least a threshold value are presented to a user via a notification message. The notification message may be presented to the user via a mobile device, and may be communicated to the user without being requested by the user.

Further, advertisements ("ads") may be selected by the content selector 245 based at least in part on an influence metric associated with the ad, with the user, and/or with an object associated with the user. For example, an advertisement with at least a threshold influence metric may be presented to a user having an influence metric less than a threshold value. As another example, the content selector 245 identifies an object having at least a threshold influence metric and connected to the user and selects an advertisement associated with the identified object for presentation to the user. Advertisers may provide the social networking system 140 with influence metric ranges, influence metric thresholds, or other descriptions of influence metrics when bidding for advertisement presentation by the social networking system 140.

Influence metrics associated with user profiles may be used by advertisers to sponsor distribution of stories describing actions taken by social networking system users. For example, an advertiser may provide incentives to a user having at least a threshold influence value to increase the likelihood the user allows the advertiser to sponsor distribution of stories describing actions performed by the user. Examples of incentives provided to a user include: sponsoring a user's purchase of an item, offering a discount or rebate to a user purchasing an item, crediting a user for future purchases of items associated with the advertiser, or other suitable incentives. As an additional example an advertiser may provide a user with a "premium experience," such as a sample of a product, a discount at a restaurant or other business, free or discounted tickets to events, and the like based on the user's influence metric. In return, the user performs an action associated with the advertiser (e.g., posting content to the social networking system, checking-in to a location, attend an event, upload an image, or any other suitable action).

In some embodiments, the incentive offered to a user is based on the user's influence metric, allowing users with higher influence metrics to receive more substantial incentives than users with lower influence metrics. For example, the incentives provided by the advertiser for a sponsored action by a user having an influence metric of at least a threshold value are greater than the incentives provided to a user having an influence metric less than the threshold value. If a user allows an advertiser to sponsor actions performed by the advertiser, stories describing the user performing a sponsored action are presented to users connected to the user allowing the advertiser to sponsor actions. This allows advertisers to leverage the influence metrics of certain users to gain exposure and visibility among the users connected to the user.

Additionally, the content selector 245 may select objects for display in a map interface or may select objects for search results based on the influence metrics associated with the objects. For example, the content selector 245 identifies locations or events near a user based on location information received from a client device 110 and influence metrics associated with objects associated with the locations or events. For example events, advertisements, or other objects associated with locations within a threshold distance of the location information having at least a threshold influence metric or having the highest influence metrics are displayed. Alternatively, the influence metric associated with the user from which location information was received may be used to select objects for presentation. Further, objects associated with search results may be ranked based on their corresponding influence metrics; for example, search results associated with objects having higher influence metrics are more prominently presented. As another example, search results associated with objects having less than a threshold influence metric are not displayed.

In addition to selecting content, influence metrics may be used to allocate other social networking system 140 resources. For example, increased bandwidth, human operator time, processing resources, and other users may be allocated to users having the highest influence metrics or having at least a threshold influence metric. Resources for growing user interaction with the social networking system or a user base of the social networking system may similarly be allocated based on influence metrics. For examples, users with high influence metrics and associated with certain regions or other categorizations may receive an increased number of recommendations, offers, and the like can be targeted to users to encourage engagement with the social networking system 140. Prioritizing resources for increasing user interaction to users in certain regions or categories based on influence metrics allows the social networking system 140 to target growth in particular locations or categories.

Additionally, the content selector 245 may use relevance metrics when selecting content for users. This allows the content select 245 to account for the relevance of content previously associated with a user when presenting content to the user. For example, different types of objects may be selected for presentation to a user if the user is associated with a relevance metric less than a threshold value. As the relevance metric indicates the relevancy of objects associated with the user to the user, if the objects associated with the user have a low relevance, objects with different attributes may subsequently be selected for the user.

The content selector 245 can also use aggregated relevance metrics in combination with influence metrics when selecting content for sets of users. For example, the content selector 245 can prioritize users in a set of users with an influence metric that is higher relative to the aggregated relevance metric of the set of users for selection and display of content. In addition, aggregated relevance metrics can be used to target particular markets of users; if a first set of users is associated with a higher aggregated relevance metric than a second set of users, the content selector 245 can select stories or ads for display to the second set of users. In such an embodiment, the second set of users may have, on average, less relevant content displayed to them (for instance, in their newsfeeds) than the first set of users, and content selected for display by the content selector 245 may accordingly be more relevant to the second set of users.

The web server 250 links the social networking system 140 via the network 120 to the one or more client devices 110, as well as to the one or more third party websites 130. The web server 250 serves web pages, as well as other web-related content, such as JAVA®, FLASH®, XML and so forth. The web server 250 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 250 to upload information, for example, images or videos that are stored in the content store 210. Additionally, the web server 250 may provide API functionality to send data directly to native client device operating systems.

Social Networking System Influence Determination

Figure 3:
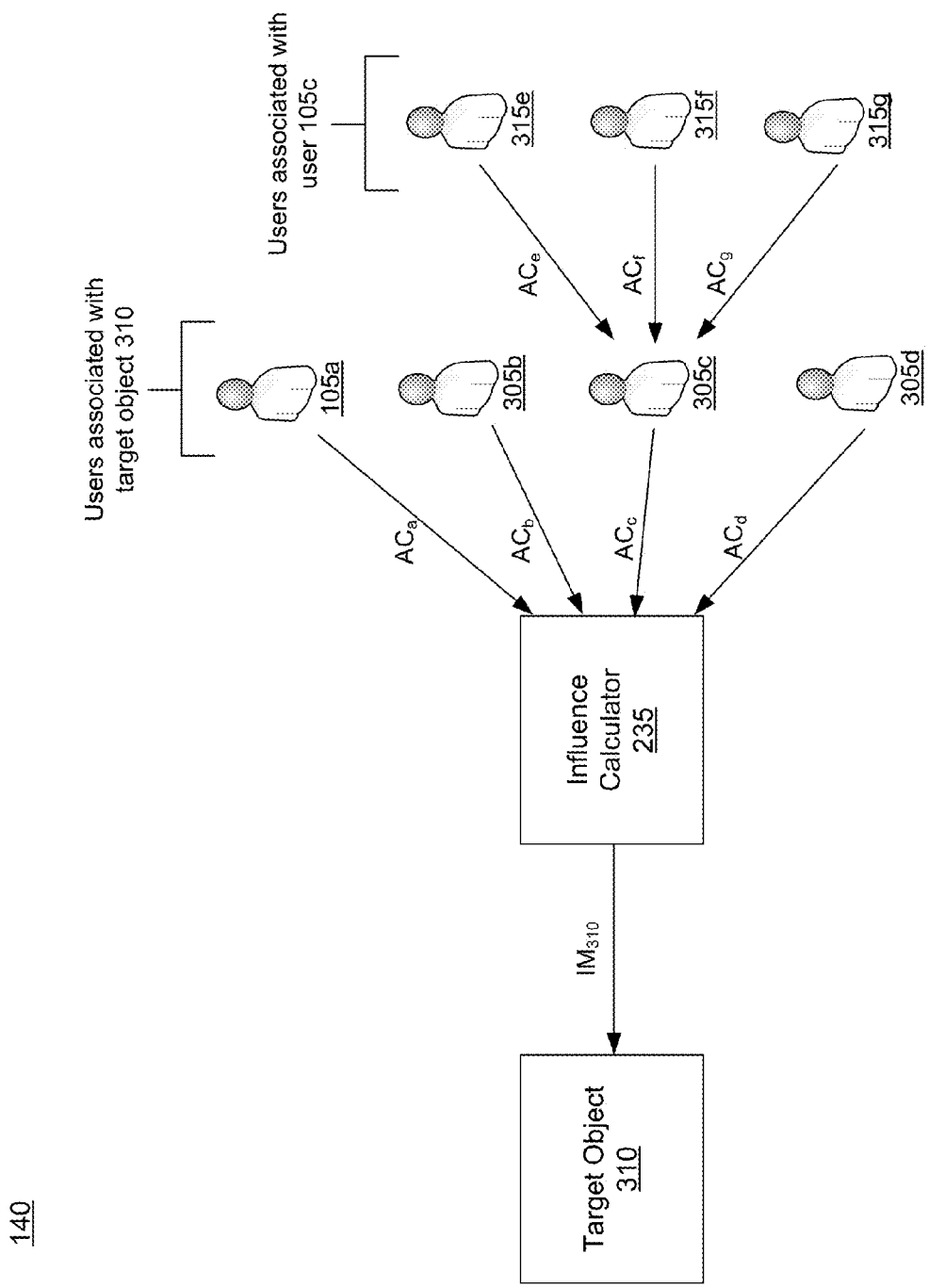
FIG. 3 is a block diagram illustrating the determination of an influence metric of an object of a social networking system, according to one embodiment.

FIG. 3 is a block diagram of a process for determining an influence metric of an object of a social networking system 140. As shown in FIG. 3, a target object 310 is identified to the influence calculator 235, which identifies users 305a, 305b, 305c, 305d (also referred to individually and collectively using reference number 305) associated with the target object 310. For example, the influence calculator 235 identifies users having an edge to the target object 310 from the edge store 230. In one embodiment, the influence module 235 identifies all users associated with the target object 310. Alternatively, the influence module 235 identifies a subset of users associated with the target object 310, such as a threshold number of users or users having a threshold affinity for the target object 310. A user 305 may be associated with the target object 310 based on a connection between the user 305 and the target object 310 or based on an interaction between the user 305 and the target object 310.

Affinities $AC_a$, $AC_b$, $AC_c$, and $AC_d$ between each of the users 305, 305b, 305c, 305d and the target object 310 are determined from the edge store 230 and combined by the influence calculator 235 to generate the influence metric $IM_{310}$ for the target object 310. Affinities maintained by the social networking system are typically unidirectional, so the affinities determined from the edge score 230 are the affinities of the users for the target object 310. As described above in conjunction with FIG. 2, the affinity between a user 305 and the target object 310 may be affected by the number, frequency, and type of interactions between the user 105 and the target object 310, by the type of connection between the user 105 and the target 310 object, and/or by an inferred value, such as additional common objects or information associated with both the user 305 and the target object 310. For example, if the target object 310 is a song, if the user 105a frequently listens to the song, shares the song with other users, and/or purchases and downloads the song, and if the user 105b seldomly listens to the song, the affinity coefficient $AC_a$ associated with the user 105a may be higher than the affinity coefficient $AC_b$ associated with the user 105b.

The influence module 235 combines the affinities $AC_a$, $AC_b$, $AC_c$, and $AC_d$ to determine an influence metric $IM_{310}$ describing the relevance of the target object 110 to users throughout the social networking system 140. For example, the influence metric $IM_{310}$ is the mean or median of the accessed affinities. Alternatively, the influence module 235 applies various weights to the accessed affinities and determines a mean or median of the weighted affinities. In one embodiment, the accessed affinities are weighted based on times associated with interactions used to generate the affinities. For example, an affinity associated with an interaction occurring 5 minutes ago is weighted more heavily an affinity associated with an interaction that occurred 3 days ago.

In some embodiments, the influence module 235 can combine the accessed affinities by determining $IM_{310}$ to be the weighted or unweighted sum or product of the accessed affinities. In other embodiments, any suitable combination may be performed using the affinities $AC_a$, $AC_b$, $AC_c$, and $AC_d$. For example, the influence module 235 can normalize an influence metric based on the number of users 305 associated with the target object 310 or by the number of affinities retrieved by the influence module 235. In such an example, an influence metric may be discounted if the set of users associated with the target object 310 is less than a threshold number.

The influence module 235 may also access affinities $AC_e$, $AC_f$, $AC_g$ associated with users 315e, 315f, 315g (also referred to individually and collectively using reference number 315) associated with the target object 310 via user 305c ("indirectly associated users"). For example, affinities $AC_e$, $AC_f$, $AC_g$ for users connected to users 305c associated with the target object 310, but not directly associated with the target object 310, are accessed and used to calculate the influence metric $IM_{310}$. In some embodiments, the influence module 235 discounts affinities associated with indirectly associated users based on the amount of attenuation between the target object 310 and the indirectly associated users. For example, affinities of users 315 connected to users 305 associated with the target object 310 may be attenuated by 50%, or another amount, relative to affinities associated with users 305 associated with the target object 310. The attenuation of affinities associated with indirectly associated users may increase based on the degree of separation between the target object 310 and the indirectly associated users.

An influence metric $IM_{310}$ may be numeric or non-numeric (e.g., a ranking of "high," "medium," "low," and the like). The influence metric $IM_{310}$ may be stored in the user profile store 205 or in the content store 210, depending on whether the target object 310 is a user profile or an object. In one embodiment, an influence metric is determined and stored for each object, including user profiles, in the social networking system 140. The influence module 235 may periodically update stored influence metrics or may update a stored influence metric when an interaction with the object is received. As described above in conjunction with FIG. 2, the content selector 245 may used influence metrics associated with objects when selecting content for presentation to a user.

Figure 4:
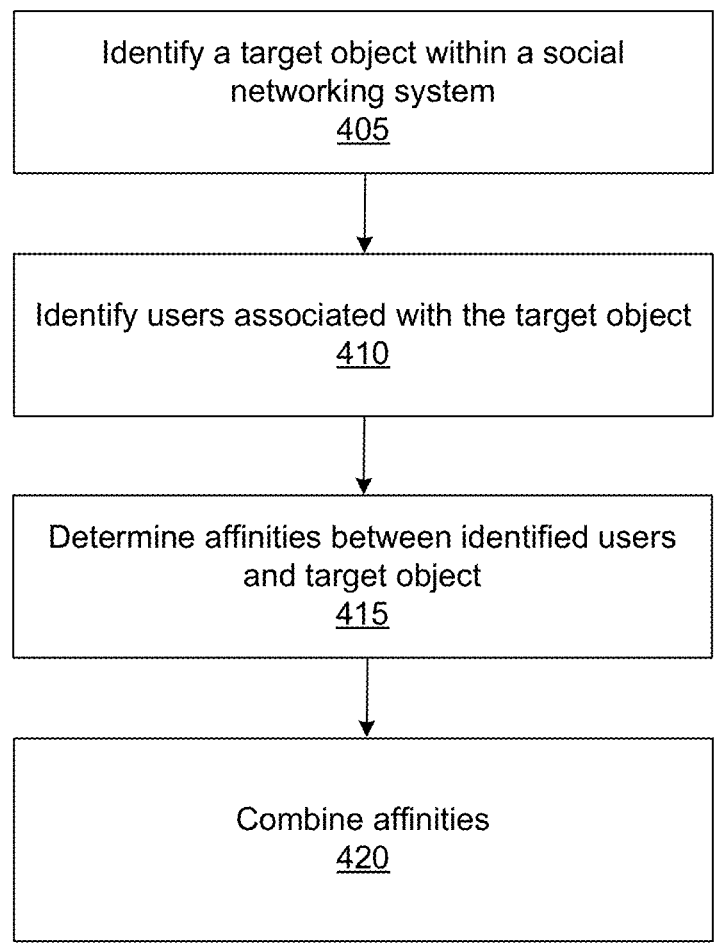
FIG. 4 is a flow chart of a process for determining an influence metric for an object, according to one embodiment.

FIG. 4 is a flow chart of one embodiment of a process 400 for determining an influence metric of an object maintained by a social networking system 140. A target object is identified 405 and users associated with the target object are identified 405. As described above, the target object may be a user profile, a page, an event, a group, or other content item. Additionally, users associated with the target object are identified 405 as users connected to the target object by an edge in the edge store. Thus, users associated with the target object may have an express connection to the target object or may have performed an interaction with the target object.

Affinities between each of the users associated with the target object and the target object are determined 415 and combined, as described above in conjunction with FIG. 3, to determine the influence metric of the target object. Additional information, such as the number of users associated with the target object, the recency of interactions between a user associated with the target object and the target object, or other criteria may also be used when determining the influence metric. As described above in conjunction with FIG. 1, the influence metric may be stored and subsequently used to select content for presentation to a user.

Social Networking System Relevance Determination

Figure 5:
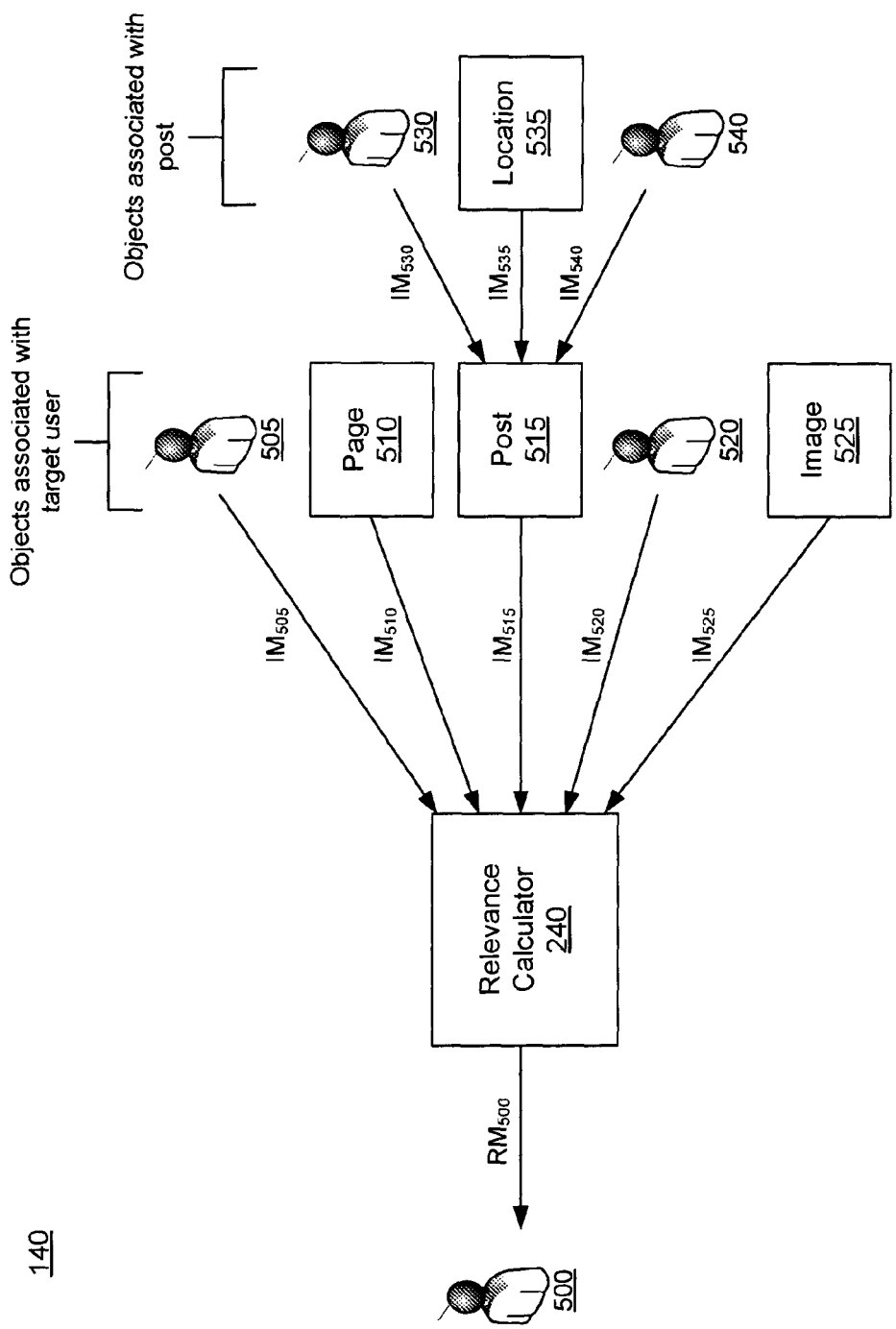
FIG. 5 is a block diagram illustrating the determination of a relevance metric of a user of a social networking system, according to one embodiment.

FIG. 5 is a block diagram of determining a relevance metric of a user of a social networking system 140 according to one embodiment. As shown in FIG. 5, a target user 500 is identified by the relevance calculator 240 and objects associated with the target user 500 are determined from the edge store 230. In various embodiments, the relevance calculator 240 may identify each object associated with the target user 500 or may identify a subset of objects associated with the target user 500 having one or more specified characteristics. For example, the relevance module 240 identifies objects with which the target user 500 has interacted within a threshold amount of time, identifies specific types of objects associated with the target user 500, identifies objects with which the user of objects associated with the target user, or may identify objects associated with the target user with which the user has at least a threshold affinity, or identifies objects having any suitable criteria.

In the example of FIG. 5, the relevance calculator 235 identifies a user 505, a page 510, a post 515, a user 520, and an image 525 associated with the target user 500. Also in the embodiment of FIG. 5, the relevance calculator 235 identifies objects associated with objects associated with the target user 500 (objects "indirectly associated" with the target user 500). For example, the relevance calculator 235 identifies additional objects associated with the post 515, such as a user 530, a location 535, and a user 540. While FIG. 5 illustrates limited types of objects associated with the target user 500, any suitable type of object may be associated with the target user 500.

The relevance module 235 determines the influence metrics $IM_{505}$, $IM_{510}$, $IM_{515}$, $IM_{520}$, and $IM_{525}$ associated with each object associated with the target user 500. As described above, the influence metric of an object represents the object's influence to social networking system users. The influence metrics may be retrieved from the influence calculator 230, from the user profile store 205, and/or from the content store 210. In one embodiment, influence metrics may be modified or updated when the objects are identified by the relevance module 235. Additional information may be used along with the influence metrics when generating the relevance metric.

To generate the relevance metric $RM_{500}$ associated with the target user 500, the relevance module combines the influence metrics $IM_{505}$, $IM_{510}$, $IM_{515}$, $IM_{520}$, $IM_{525}$ associated with the identified objects. For example, the relevance metric $RM_{400}$ is the mean, median, sum, or product of the influence metrics. In some embodiments, the influence metrics are weighted and the weighted influence metrics are combined to determine the relevance metric $RM_{500}$. For example, the relevance calculator 240 module weights influence metrics based on the type of object associated with an influence metrics (e.g., influence metrics associated with objects may have higher weights than influence metrics associated with posts). As another example, the influence metrics are weighted based on an affinity of the target user 500 for the objects associated with the influence metrics (e.g., a weight of an influence metric is proportional to the affinity of the target user 500 for the object associated with the influence metric).

The relevance calculator 240 may account for influence metrics for one or more objects indirectly associated with the target user 500 when determining the relevance metric $RM_{500}$. In the example of FIG. 5, influence metrics $IM_{530}$, $IM_{535}$, $IM_{540}$ associated with objects associated with the post the post 415, but not directly associated with the target user 500 are retrieved. The relevance calculator 240 combines these influence metrics $IM_{530}$, $IM_{535}$, $IM_{540}$ with the influence metrics $IM_{505}$, $IM_{510}$, $IM_{515}$, $IM_{520}$, $IM_{525}$ of objects directly associated with the target user 500 to generate the relevance metric $RM_{500}$. In some embodiments, influence metrics associated with indirectly associated objects may be attenuated; the amount of attenuation may be based on the degree of separation between the target user 500 and the indirectly associated objects.

A relevance metric $RM_{500}$ may be numeric or non-numeric (e.g., a "high," "medium," or "low" ranking) In one embodiment, the relevance module 240 determines a relevance metric for multiple users of the social networking system 140 and stores the relevance metric associated with a user in the corresponding user profile in the user profile store 205. Stored relevance metrics may be periodically updated or may be updated when a user interacts with an object. Because the relevance metric $RM_{500}$ associated with the target user 400 indicates the relevance of objects associated with the target user 500 to the target user, the relevance metric $RM_{500}$ may be used to infer the relevance of stories in a newsfeed or news ticker presented to the target user 500 associated with objects associated with the target user 500.

Figure 6:
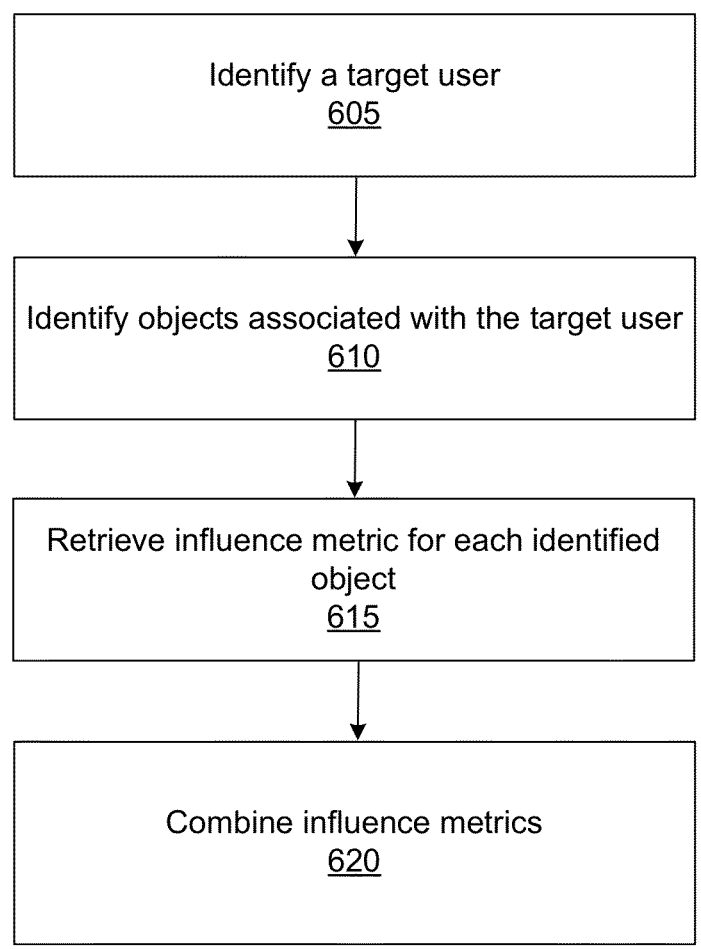
FIG. 6 is a flow chart of a process for determining a relevance metric for a social networking system user, according to one embodiment.

FIG. 6 is a flow chart of one embodiment of a process 600 for determining a relevance metric for a target user of a social networking system 140. A target user is identified 605 by the relevancy calculator 245, which also identifies 610 objects associated with the target user from the edge store 230. As described above, objects associated with the target user may be objects to which the target user has explicitly established a connection or may be an object with which the target user has interacted. Additionally, the objects may be identified 610 based on one or more criteria so that a subset of the objects associated with the objects are identified 610. For examples objects having a specified type, a threshold affinity with the target user, or other suitable characteristic are identified 610.

The relevancy calculator 240 retrieves 615 an influence metric associated with each of the identified objects. In various embodiments, the influence metric is retrieved from the influence calculator 235, the user profile store 205, and/or the content store 210. The influence metrics are then combined by the relevancy calculator 240 to determine the relevance metric. As described above in conjunction with FIG. 5, the influence metrics may be combined in any suitable manner to generate the relevancy score.

The relevancy calculator 240 may combine relevance metrics associated with a set of users to generate an aggregated relevance metrics for the set of users. Various criteria may be used to select the set of users. For example, the set of users includes users having at least one common characteristic. Examples of the characteristic used to select the set of users include: a common place of employment, a common hometown, a common geographic region, a common interest, a common hobby, or other suitable characteristic. The relevance metrics associated with each user in the set may be combined in any suitable manner. For example, the aggregated relevance metric is the mean or median of the relevance metrics. In one embodiment, the relevance metrics associated with different users may be differently weighted, and the weighted relevance metrics are combined to determine the aggregated relevance metric. Various characteristics of the users may be used when weighting the relevance metrics. For example, relevance metrics may be weighted based on geographic criteria, or demographic criteria, influence metrics, or other data associated with the users in the set of users.

Aggregated relevance metrics may be stored for different sets of users for use by the content selector 245 in selecting content for users. For example, an aggregated relevance metric is stored for sets of users in different countries, for sets of users in different age ranges, or for sets of users having any suitable common characteristic. In various embodiments, the stored aggregated relevance metrics may be periodically updated.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing associations between a plurality of objects and a plurality of users in a social networking system;
    identifying a target user of the social networking system;
    identifying objects associated with the target user based on the stored associations;
    retrieving an influence metric associated with each of the identified objects, each influence metric identifying the influence of an associated object on a plurality of users associated with the object based on actions performed by the plurality of users related to the associated object and based on an amount of time since each action was performed such that an influence metric is weighted more heavily by a first action than by a second action, the first action performed more recently than the second action;
    generating, by a hardware processor, a relevance metric for the target user based on an aggregation of the retrieved influence metrics, the relevance metric describing an aggregated relevance of the identified objects with which the target user is associated in the social networking system;
    selecting content for presentation based on an influence metric associated with the selected content;
    selecting the target user from the plurality of users based on the relevance metric for the target user; and
    presenting the selected content to the target user as a story in a social networking system newsfeed interface at a location within the newsfeed interface based on the influence metric associated with the selected content, the newsfeed interface displaying stories ordered based on influence metrics associated with objects associated with the stories.

2. The method of claim 1, wherein generating the relevance metric for the target user based on the aggregation of the retrieved influence metrics comprises:
    determining a median or a mean of the influence metrics.

3. The method of claim 1, wherein generating the relevance metric for the target user based on the aggregation of the retrieved influence metrics comprises:
    applying a weight to each of the influence metrics to generate weighted influence metrics; and
    generating the relevance metric based on the weighted influence metrics.

4. The method of claim 3, wherein a weight applied to an influence metric is based at least in part on a characteristic of an object associated with an influence metric.

5. The method of claim 4, wherein the characteristic is a type associated with the object or an affinity between the target user and the object.

6. The method of claim 3, wherein generating the relevance metric based on the weighted influence metrics comprises:
    determining a median or a mean of the weighted influence metrics.

7. The method of claim 1, wherein identifying objects associated with the target user based on the stored associations comprises:
    identifying objects associated with the target user and having a specified characteristic.

8. The method of claim 7, wherein the specified characteristic is selected from a group consisting of: a type of object, an affinity between the target user and an object, and any combination thereof.

9. The method of claim 1, wherein selecting content comprises selecting a content object of a first type for presentation to the target user if the relevance metric for the target user is less than a threshold, and selecting a content object of a second type for presentation to the target user if the relevance metric for the target user is greater than the threshold.

10. A method comprising:
    identifying a target user of a social networking system;
    identifying objects associated with the target user based on associations between a plurality of objects and the target user stored by the social networking system;
    retrieving an influence metric associated with each of the identified objects, each influence metric identifying an influence of an associated object on a plurality of users associated with the object based on actions performed by the plurality of users related to the associated object and based on an amount of time since each action was performed such that an influence metric is weighted more heavily by a first action than by a second action, the first action performed more recently than the second action;
    generating, by a hardware processor, a relevance metric for the target user based on the retrieved influence metrics, the relevance metric describing an aggregated relevance of the identified objects in the social networking system; and
    selecting content for presentation to the target user based on an influence metric associated with the selected content;

selecting the target user from the plurality of users based on the relevance metric for the target user; and presenting the selected content to the target user as a story in a social networking system newsfeed interface at a location within the newsfeed interface based on the influence metric associated with the selected content, the newsfeed interface displaying stories ordered based on influence metrics associated with objects associated with the stories.

11. The method of claim 10, wherein generating the relevance metric for the target user based on the retrieved influence metrics comprises:

determining a median or a mean of the influence metrics.

12. The method of claim 10, wherein generating the relevance metric for the target user based on the retrieved influence metrics comprises:

applying a weight to each of the influence metrics to generate weighted influence metrics; and generating the relevance metric based on the weighted influence metrics.

13. The method of claim 10, wherein the content includes at least one advertisement.

14. The method of claim 10, wherein identifying objects associated with the target user based on the stored associations comprises:

identifying objects associated with the target user and having a specified characteristic.

15. The method of claim 10, wherein the specified characteristic is selected from a group consisting of: a type of object, an affinity between the target user and an object, and any combination thereof.

16. A method comprising:

identifying a plurality of users of a social networking system, each of the plurality of users having a common characteristic;

identifying objects associated with each of user of the plurality of users based on associations between the plurality of users and the identified objects maintained by the social networking system;

retrieving an influence metric associated with each of the identified objects, each influence metric for an associated object comprising a measure of an influence of the object on a plurality of users associated with the object based on actions performed by the plurality of users related to the associated object and based on an amount of time since each action was performed such that an influence metric is weighted more heavily by a first action than by a second action, the first action performed more recently than the second action;

generating, by a hardware processor, a relevance metric for each user of the plurality of users, the relevance metric for a user based on the influence metrics of the identified objects associated with the user; and generating an aggregated relevance metric for the plurality of users based on the relevance metrics of the plurality of users;

selecting content for presentation based on an influence metric associated with the selected content and based on the aggregated relevance metric; and presenting the selected content to the plurality of users as a story in a social networking system newsfeed interface at a location within the newsfeed interface based on the influence metric associated with the selected content, the newsfeed interface displaying stories ordered based on influence metrics associated with objects associated with the stories.

17. The method of claim 16, wherein generating the aggregated relevance metric for the plurality of users based on the relevance metrics of the plurality of users comprises:

determining a median or a mean of the relevance metrics.

18. The method of claim 16, wherein generating the aggregated relevance metric for the plurality of users based on the relevance metrics of the plurality of users comprises:

applying a weight to each of the relevance metrics to generate weighted relevance metrics; and generating the aggregate relevance metric based on the weighted relevance metrics.

19. The method of claim 16, wherein the common characteristic is a geographical region associated with the identified plurality of users.

20. The method of claim 16, further comprising:

selecting content for presentation to one or more of the plurality of users based at least in part on the aggregated relevance metric for the plurality of users.

* * * * *